United States Patent [19]

Oda

[11] Patent Number: 5,838,888

[45] Date of Patent: Nov. 17, 1998

[54] IMAGE RECORDER

[75] Inventor: Naoki Oda, Kasugai, Japan

[73] Assignee: Brother Kogyo Kabushiki Kaisha, Nagoya, Japan

[21] Appl. No.: 774,377

[22] Filed: Dec. 27, 1996

[30] Foreign Application Priority Data

Dec. 27, 1995 [JP] Japan .................................. 7-353898

[51] Int. Cl.⁶ .................................................. G06K 15/00

[52] U.S. Cl. ............................................ 395/115; 395/108

[58] Field of Search .......................... 347/12, 13, 56–59, 347/40–42, 54, 55, 68, 180, 181, 182; 395/101, 104, 108, 115, 116; 400/120.05, 120.06; 358/471, 494, 296

[56] References Cited

U.S. PATENT DOCUMENTS 5,142,296  8/1992  Lopez et al. .............................. 347/12

Primary Examiner—Arthur G. Evans
Attorney, Agent, or Firm—Oliff & Berridge, PLC

[57] ABSTRACT

To increase the printing speed by distributing data processing of a printing head, an image recorder is provided with a print buffer for storing print data received from an information processor, a printing head having nozzles for plural channels that print on the basis of the print data stored in the print buffer, a 4-bit shift register unit that temporarily stores the print data of the print buffer and sequentially supplies the print data for each dot to the printing elements, and a buffer controller that divides the nozzles into odd and even channel groups and transfers the print data corresponding to the channel groups with a staggered timing to the 4-bit shift register unit from the print buffer.

20 Claims, 14 Drawing Sheets

FIG.9A

| 0000H | 0001H | 0002H |
|-------|-------|-------|
| 0100H | 0101H | 0102H |
| 0200H | 0201H | 0202H |
| 0300H | 0301H | 0302H |

| 00000000 | 00000000 | 00 |
|----------|----------|----|
| 11111111 | 11111111 | 11 |
| 00000000 | 00000000 | 00 |
| 11111111 | 11111111 | 11 |
| 00000000 | 00000000 | 00 |
| 11111111 | 11111111 | 11 |
| 00000000 | 00000000 | 00 |
| 11111111 | 11111111 | 11 |
| 00000000 | 00000000 | 00 |
| 11111111 |          |    |
| 00000000 |          |    |

IMAGE RECORDER

BACKGROUND OF THE INVENTION

1. Field of the Invention

The invention relates to an image recorder that executes a main scanning of a printing head to print characters for each of a plurality of bands.

2. Description of Related Art

An information processor including a personal computer is generally designed to connect with an image recorder that can print data composed of characters or graphics on printing paper as visual information (FIG. 4). Various printing systems such as impact, thermosensitive, and ink jet systems have been applied to the image recorder. However, generally in the image recorder, the main scanning of a printing head provided with plural printing elements (for example, 64 channels) of the foregoing system is executed to print on paper for one band and, afterwards, sub-scanning is executed for the bands on the paper and repeating this printing process will print on the entire paper.

That is, the conventional image recorder has, as shown in FIG. 1, a print buffer 61 capable of storing print data for one or more bands, a printing head driver (not illustrated) that causes each of the printing elements to perform assigned printing, and a printing controller 64 provided with a DMA (Direct Memory Access) controller 62 and a 4-bit shift register 63 that distributes print data for each dot to the printing head driver corresponding to the channels of the printing elements.

Although the shift register 63 is provided with 64 channel shift registers, the printing performance will herein be described, drawing attention to a 0-channel shift register 63A and a 1-channel shift register 63B of the 4-bit shift register 63. As shown in FIG. 2, print data (○0–○3, ●0–●3) of four bits stored in the print buffer 61 is transferred to the 4-bit shift register 63 by the DMA controller 62 (S1) and, afterwards, these print data (○0–○3, ●0–●3) are distributed to each element of a printing head 65 from the leading bit for each one bit in the input timing of a printing clock to execute printing (S2 to S4). After the final print data (○3, ●3) are distributed from the 4-bit shift register 63, next print data (○4–○7, ●4–●7) of four bits follow to be transferred (S5) from the print buffer 61 to the 4-bit shift register 63 to execute the next printing in the input timing of a printing clock (S6 to S8). Repeating to transfer print data and execute printing leads to one band printing.

However, in the conventional system as described above, in S4 and S5 after the final print data are distributed from the 4-bit shift register 63, while the next printing clock is entered, the print data of four bits for 64 channels are designed to be transferred from the print buffer 61 to the 4-bit shift register 63. In such a construction, the transfer time required for one channel is difficult to shorten due to restriction of the readout speed by the buffer 61 and the like and, therefore, the printing speed has to be lowered so as not to enter the next printing clock until the data transfer of all the channels is completed.

SUMMARY OF THE INVENTION

The present invention has been made in view of the foregoing problems, and an object of the present invention is to provide an image recorder that distributes data processing for a printing head to raise the printing speed.

In order to accomplish the aforementioned object, according to one aspect of the invention, an image recorder comprises: a print buffer for storing print data received from an information processor; a printing head having printing elements for plural channels that print on the basis of the print data stored in the print buffer; a storage that temporarily stores the print data of the print buffer and, afterwards, sequentially distributes the print data for each dot to the printing elements; and a buffer controller that divides the printing elements into specific channel groups and transfers the print data each corresponding to the channel groups with a staggered timing to the storage from the print buffer.

The print data each corresponding to the channel groups are transferred with a staggered timing to the storage from the print buffer, the data transfer can be completed in a shorter time than in a case that the print data of all the channels are transferred at one time, and in consequence, the printing speed can be raised.

According to another aspect of the invention, the foregoing storage may be constructed such that the storage comprises a first shift register that sequentially distributes the print data for each dot to the printing elements and a second shift register that sequentially distributes the print data for each dot to the first shift register and the first shift register serves also as the second shift register.

The second shift register can be used also by the first shift register and the number of shift registers of the second shift register can be reduced, and therefore, the circuit construction can be simplified.

Further, according to another aspect of the invention, the foregoing buffer controller may be constructed so as to divide the printing elements into an odd-channel group and an even-channel group.

Using the printing head that has the odd-channel group and the even-channel group of the printing elements arranged in a staggered form will facilitate the data transfer to the storage.

Furthermore, according to another aspect of the invention, the foregoing buffer controller may be constructed so as to divide the printing elements into the first half channel group and the second half channel group.

Dividing the printing elements into the first half channel group and the second half channel group will facilitate the readout of the print data from the print buffer.

BRIEF DESCRIPTION OF THE DRAWINGS

Preferred embodiments of the present invention will be described in detail with reference to the accompanying drawings, wherein like reference numerals refer to like elements:

FIGS. 9A to 9C are explanatory charts showing data areas of a print buffer, 9A showing an ADDRESS, 9B showing a bit state, and 9C showing a dot state;

DESCRIPTION OF PREFERRED EMBODIMENTS

A first embodiment according to the invention will hereafter be described in detail with reference to FIG. 3 to FIG. 11.

Figure 4:
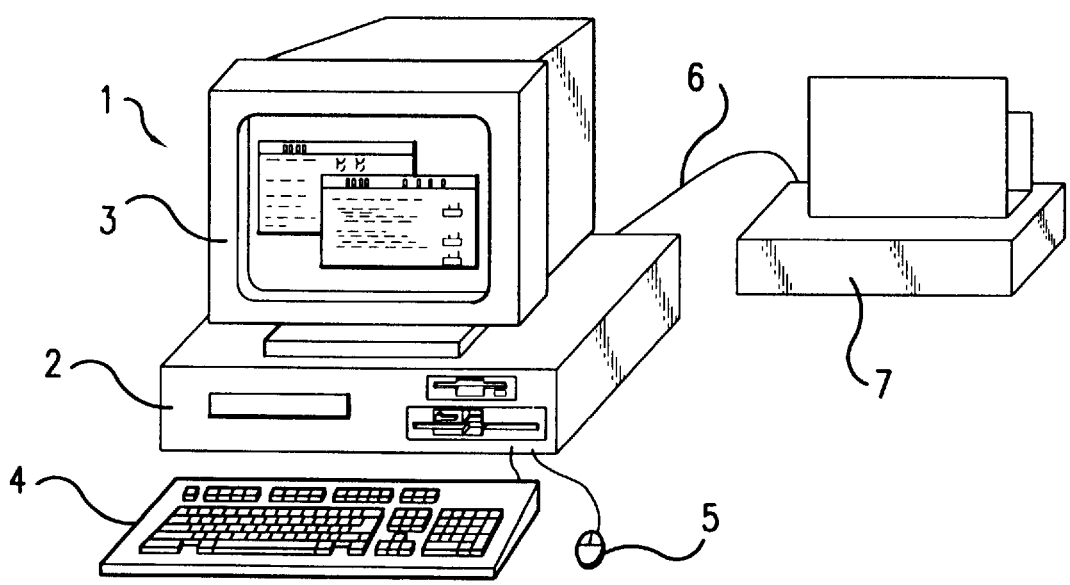
FIG. 4 is a perspective view of an image recorder connected to an information processor.
Figure 5:
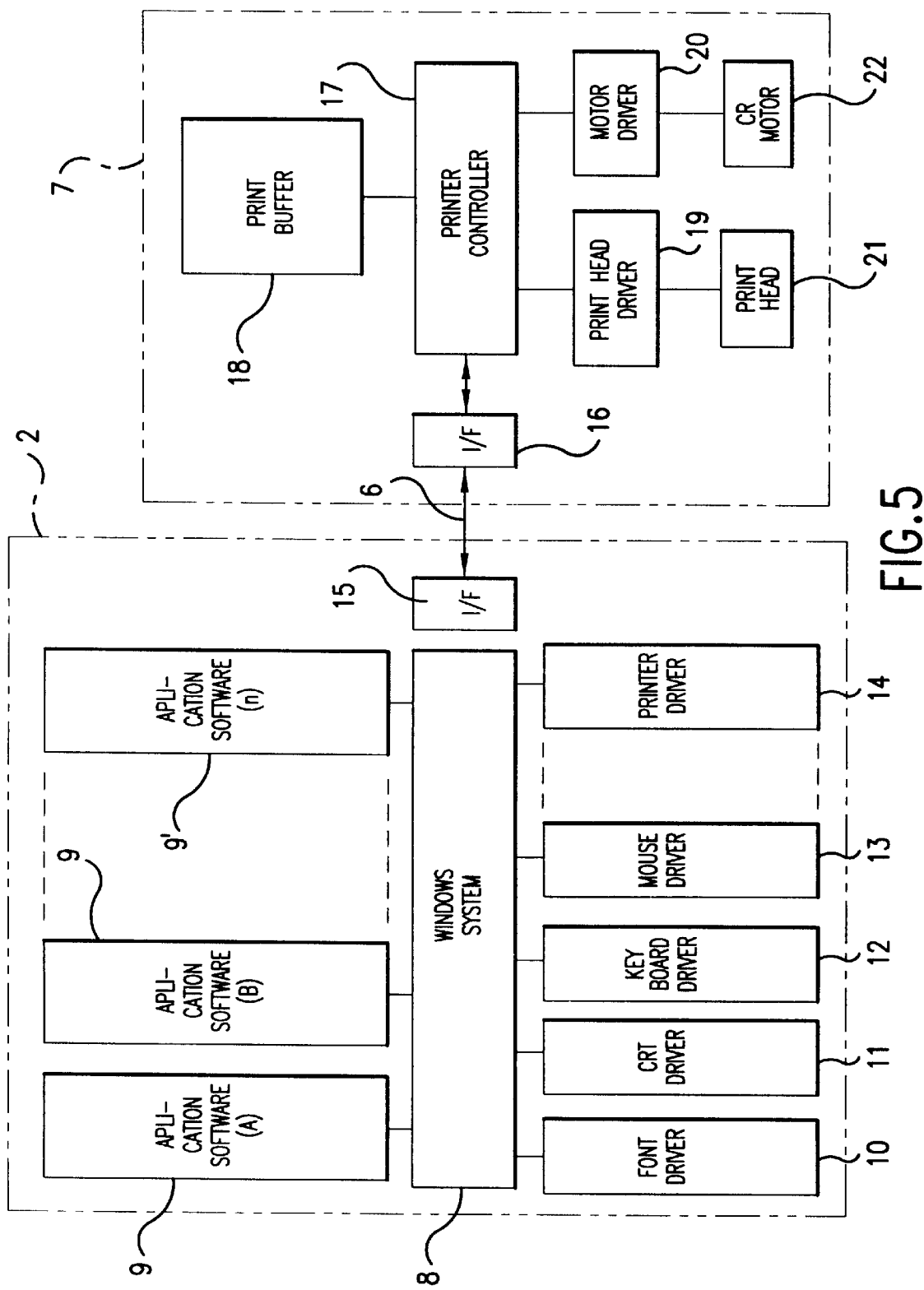
FIG. 5 is a block diagram of the image recorder and the information processor.

An image recorder relating to this embodiment is connected to an information processor 1 such as a personal computer, as shown in FIG. 4. The information processor 1 is provided with a main processing unit 2 in which an auxiliary memory such as a hard disc drive and a central processing unit are built, a CRT 3 (cathode-ray tube) that displays data and the like, a key board 4 and a mouse 5 for use in data and command input, and is connected to a printer 7 as the image recorder through a printer cable 6 of, for example, Centronics specification.

The main processing unit 2 is equipped with an operating system (OS) such as a windows system 8. The windows system 8 is designed to cooperate with an application software 9 for a documentation program and the like, a font driver 10 for controlling character styles, a CRT driver 11 for controlling the CRT 3, a key board driver 12 for controlling the key board 4, a mouse driver 13 for controlling the mouse 5, and a printer driver 14 for controlling the printer 7 to execute one or more application softwares 9 at the same time.

When the menu "print" is selected to print data for example, displayed on the CRT 3, the foregoing print driver 14 will feed dot image data made by horizontally rasterizing print data as print data for each of eight bits from an interface (I/F) 15. The print data fed based on this raster scanning format is designed to enter into an I/F (interface) 16 of the printer 7.

Figure 1:
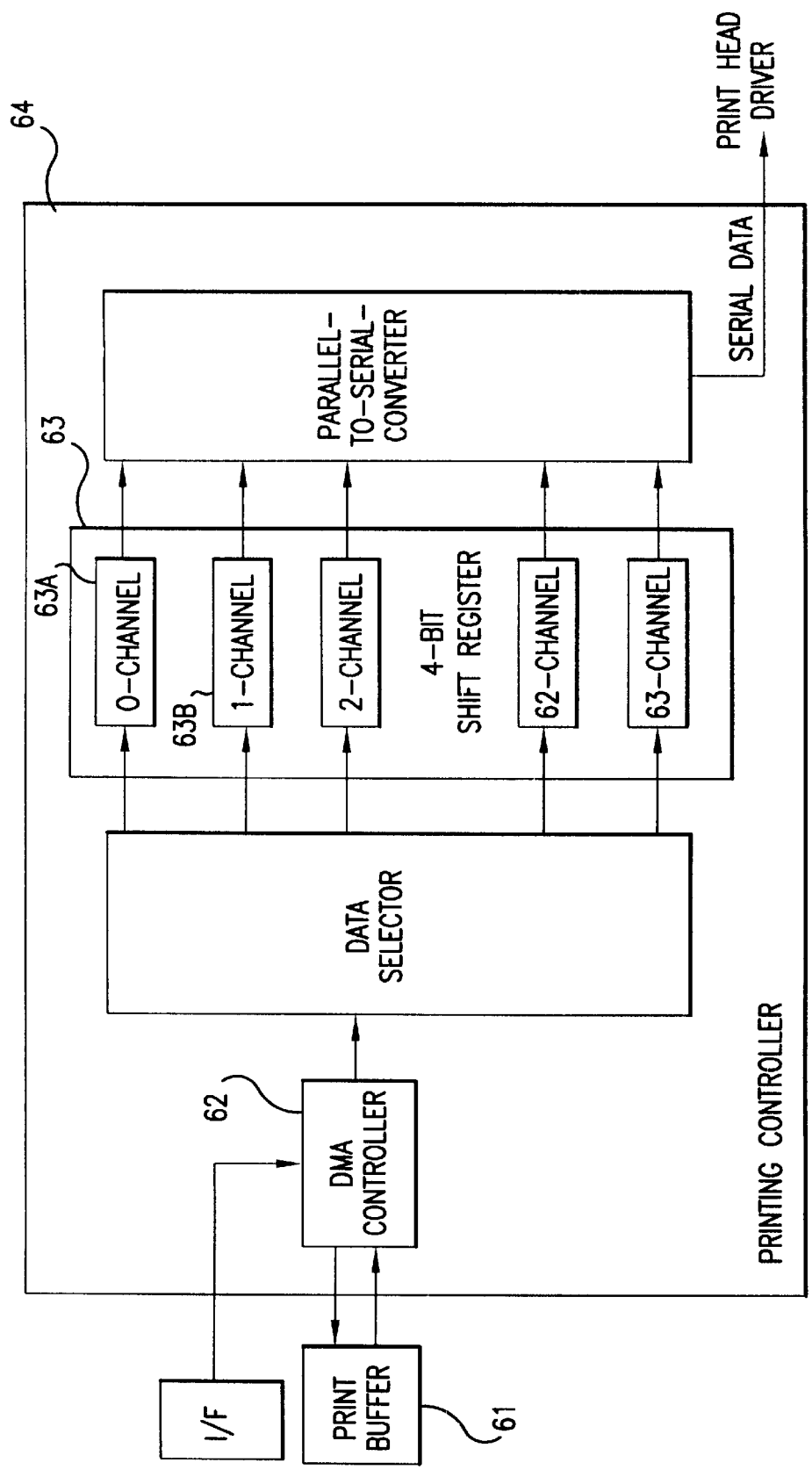
FIG. 1 is a block diagram of a printing controller, of a related art.
Figure 2:
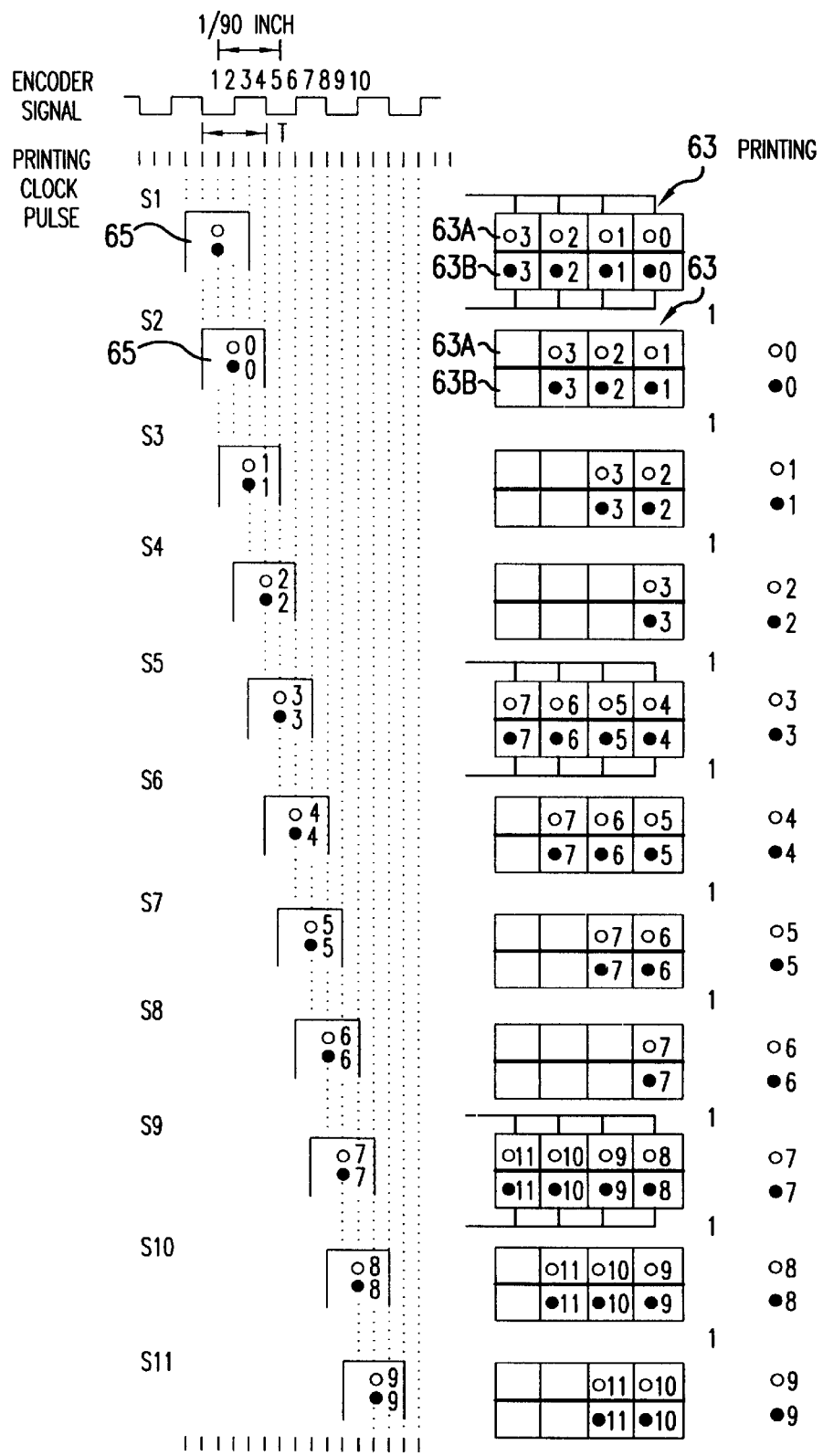
FIG. 2 is an explanatory chart of a data processing in the printing controller, of the related art.
Figure 3:
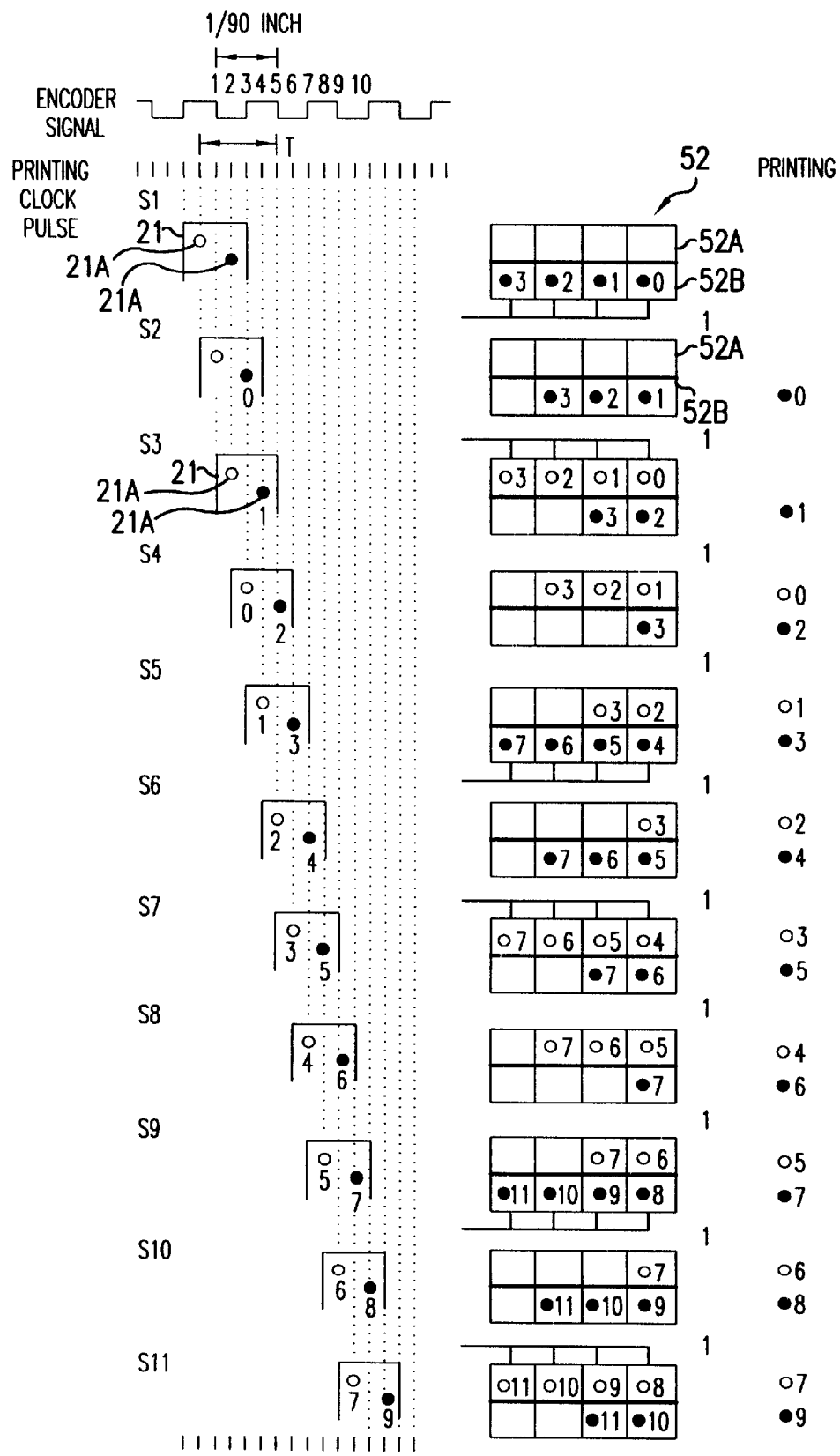
FIG. 3 is an explanatory chart of a data processing in a printing controller relating to a first embodiment.

The foregoing printer 7 is provided with a printer controller 17, print buffer 18, head driver (printing head driver) 19, and motor driver 20. The head driver 19 and motor driver 20 are connected to a printing head 21 and CR motor 22, respectively. The printing head 21 is provided with, for example, 64 channels of nozzles 21a (printing elements) to jet ink based on displacement of a piezoelectric transducer, as shown in FIG. 3. In order that the odd channel nozzles 21a precede the even channel nozzles 21a in the main scanning in a right direction, these nozzles 21a are arranged for 32 channels each in the sub-scanning direction in two longitudinal rows to the main scanning direction in a staggered form as a whole. The distance between the odd channel array and the even channel array is set to be double the printing pitch. Drive voltages from the head driver 19 are each applied to the piezoelectric transducers of these nozzles 21a to displace the piezoelectric transducers.

Figure 6:
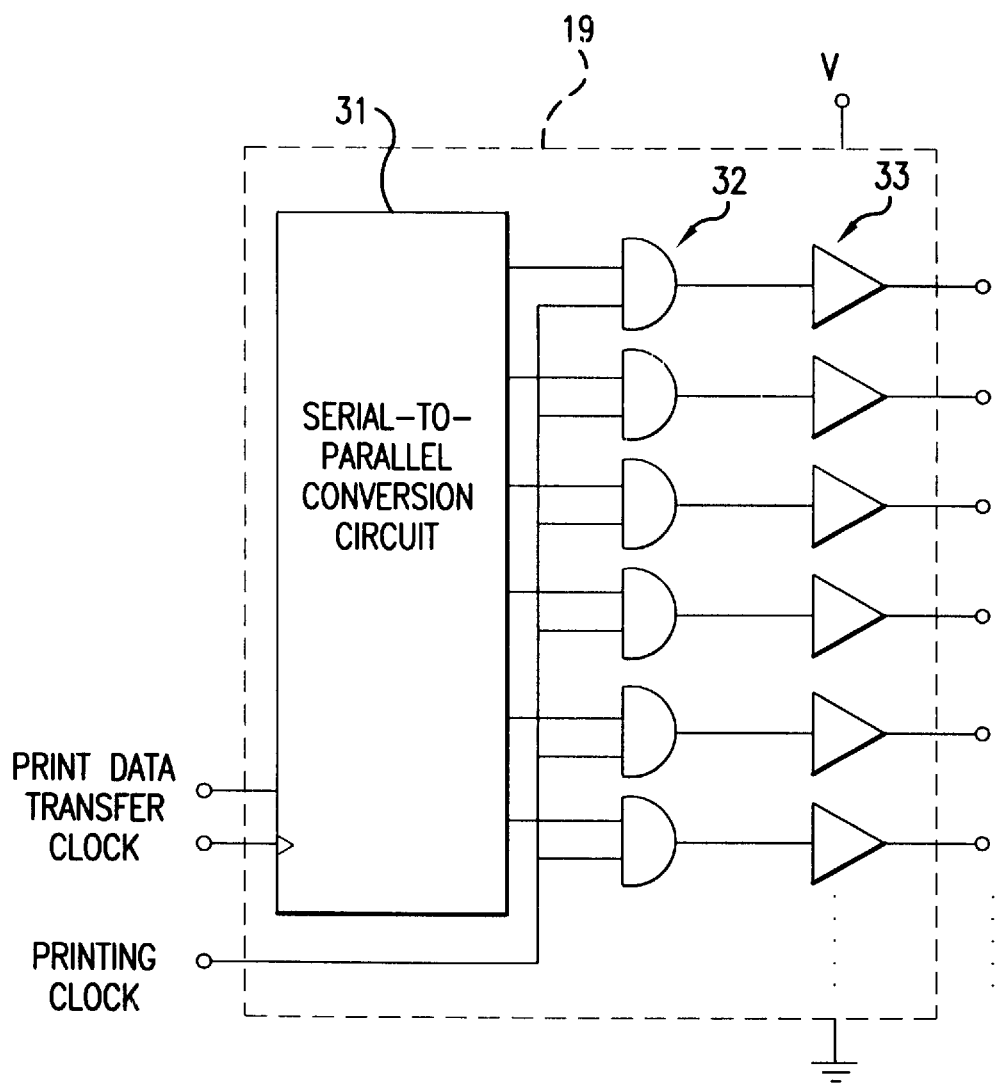
FIG. 6 is a circuit diagram of a head driver.

The foregoing head driver 19 will be described in detail. As shown in FIG. 6, the head driver 19 is provided with 2-input AND circuits 32, and buffer circuits 33, each provided corresponding to the nozzles, and a serial-to-parallel conversion circuit 31. The serial-to-parallel conversion circuit 31 receives the print data fed for each dot in a serial output format from the buffer 18 via the printer controller 17 in FIG. 5 at the input timing of a transfer clock, and distributes the print data in a parallel output format. The AND circuit 32 distributes the print data fed in a parallel output format to the buffer circuit 33 when a HIGH level printing timing signal (printing clock) is fed. The buffer circuit 33 applies a specific voltage to the corresponding piezoelectric transducer of the nozzle of the printing head 21 when the input print data are at a HIGH level.

Figure 7:
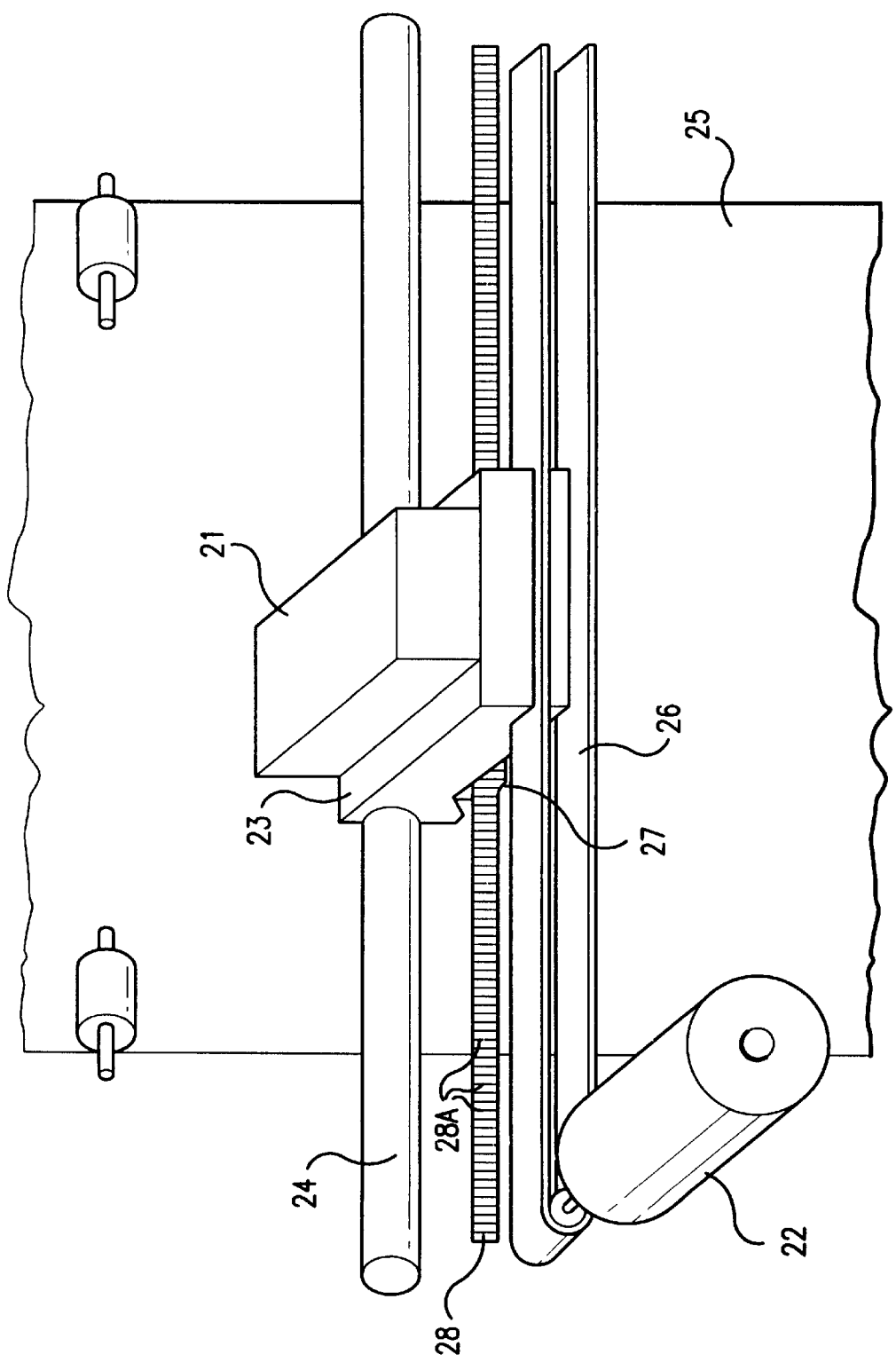
FIG. 7 is a perspective view of a major part of the image recorder.

The printing head 21 supplied with the drive voltage from the head driver 19 is fixed to a carriage 23 so that the jetting direction of ink can be set to a specific angle against printing paper 25, as shown in FIG. 7. The carriage 23 has a guide shaft 24 inserted through the body thereof laterally to the main scanning direction, and has a scanning belt 26 driven by the CR motor 22 connected thereto. The CR motor 22 drives the scanning belt 26 to move the carriage 23 freely up and down along the guide shaft 24 in the main scanning direction, thereby the printing head 21 can perform the main scanning, keeping a constant space with the paper 25.

The carriage 23 has an encoder 27 formed of optical or magnetic noncontact type sensors provided on the bottom thereof. A timing slit 28 having multiple slits 28A with an even space is provided in parallel to the guide shaft 24 in the direction that the encoder 27 detects. While the encoder 27 moves with the carriage 23 in the main scanning direction, it detects the slit 28A of the timing slit 28 to feed an encoder signal.

Figure 8:
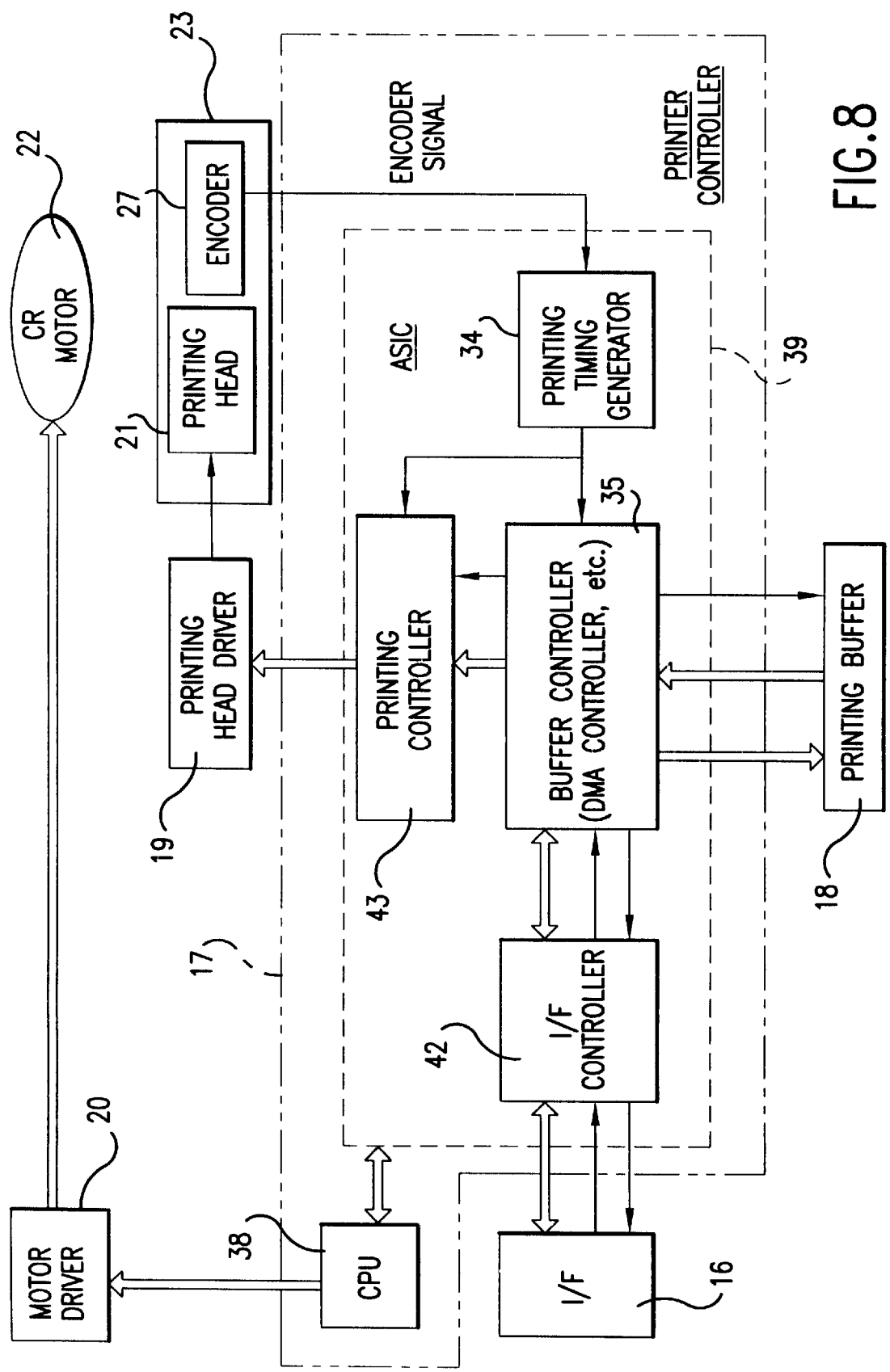
FIG. 8 is a block diagram including ASIC.

The foregoing encoder signal is designed to enter into the printer controller 17, as shown in FIG. 8. The printer controller 17 is provided with a printing timing generator 34, buffer controller 35, CPU 38, and I/F controller 42. The printing timing generator 34, buffer controller 35, I/F controller 42, and a printing controller 43 are formed integrally of a hard logic circuit such as an ASIC (Application Specific Integrated Circuit), configuring an ASIC portion 39.

Figure 10:
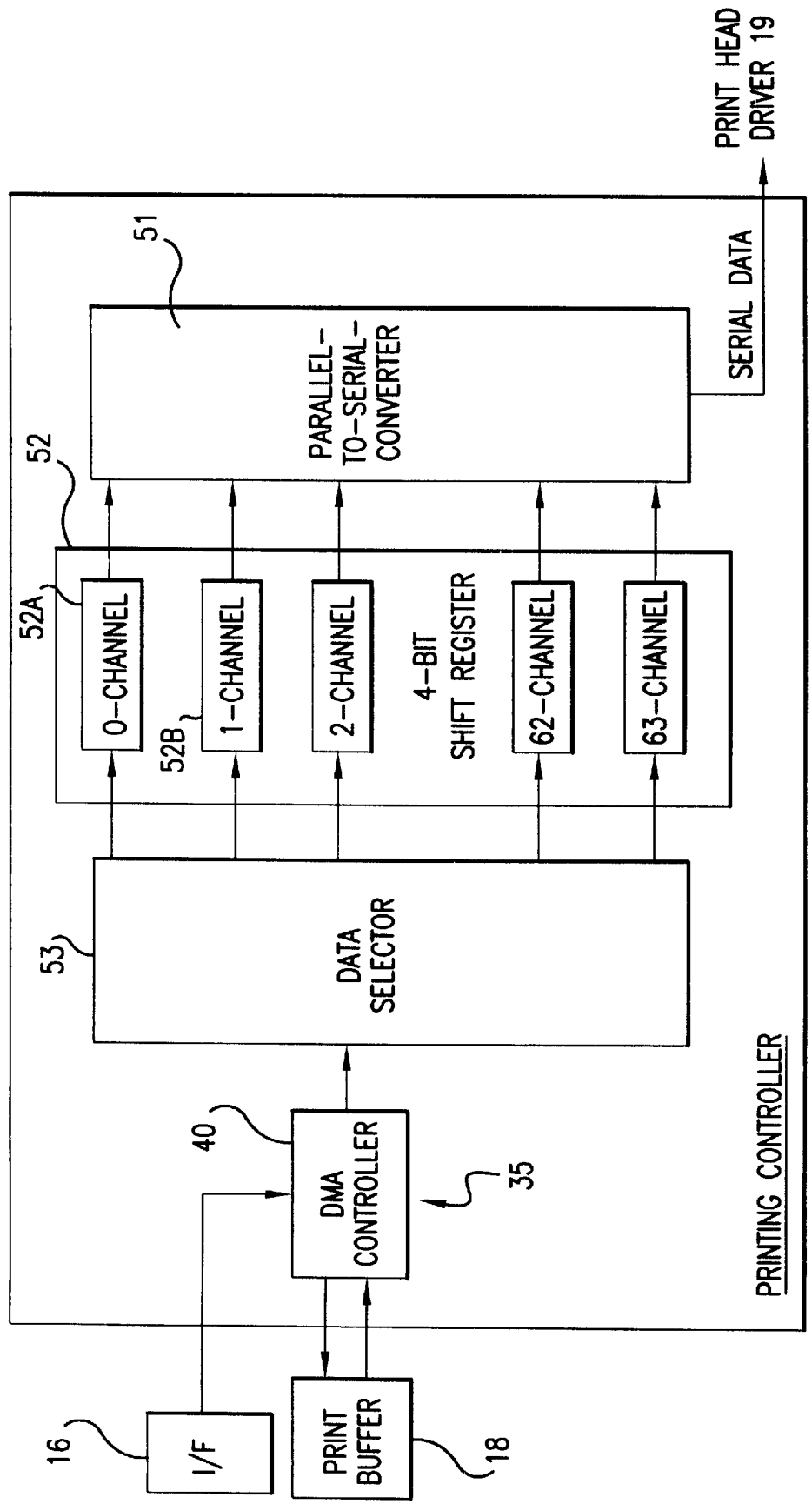
FIG. 10 is a block diagram of the printing controller.

The foregoing printing timing generator 34 forms a printing timing signal (printing clock) based on the foregoing encoder signal, and distributes the printing timing signal to the buffer controller 35 and the printing controller 43. The buffer controller 35 is equipped with, as shown in FIG. 8 and 10, a DMA controller 40 and an address generator (not illustrated). The buffer controller 35 executes a write processing to store print data entered through the I/F 16 into the print buffer 18 and a readout processing to read out the print data stored in the print buffer 18 at a specific timing and to feed the data to the printing controller 43. Buffer control means is constructed with the buffer controller 35 and printing controller 43.

The write and readout processings will hereafter be described concretely. As shown in FIG. 9A to 9C, a data table of, for example, 64 rasters is formed on the print buffer 18 in a matrix form consisting of a horizontal direction (raster direction) corresponding to the main scanning direction and a vertical direction corresponding to the sub-scanning direction. As shown in FIGS. 9B and 9C, this data table is divided into data areas of 8 bits as a transmission unit of the print data. As shown in FIG. 9A, the address of each data area is set by address data of four bites consisting of lower two bites from the horizontal direction and upper two bites from the vertical direction. As a write processing is performed, increment of the lower two bites is performed precedently to increment of the upper two bites, and the print data are sequentially stored into the data areas based on the same format as the raster scanning format when distributed from the information processor 1. On the other hand, as a readout processing is performed, increment of the upper two bites is performed with a specific increment unit precedently to increment of the lower two bites, as described later, and the print data in the vertical direction being the sub-scanning direction are read out with a specific channel group unit at a staggered timing horizontally sequentially from left to right in the drawing.

The print data read out according to the foregoing readout processing are distributed to the printing controller 43 shown in FIG. 10. The printing controller 43 is provided with a parallel-to-serial converter 51 that transfers the print data for each dot to the printing head driver 19 in a serial format at the input timing of a transfer clock, a 4-bit shift register unit 52 (storing means) that has 64 channels of a 4-bit shift register so as to distribute the print data of the entire channels (64 channels) for each dot to the parallel-to-serial converter 51, and a data selector 53 that distributes the print data for each dot to each of the shift registers of the 4-bit shift register unit 52. The printing controller 43 thus constructed temporarily stores the print data read out from the print buffer 18 and, afterwards, sequentially supplies the print data for each dot to the printing head driver 19, sequentially shifting the print data at the input timing of the printing timing signal (printing clock).

The operation of the image recorder of the foregoing construction will be described.

As shown in FIG. 4, first, as the key board 4 or mouse 5 commands "print," the windows system 8 activates the printer driver 14 to distribute dot image data formed according to the raster scanning format based on character or graphic data for printing stored in a hard disk or memory (not illustrated) as print data for each eight bits in the sequence of rasterizing. As shown in FIG. 8, the print data for each eight bits is distributed from the information processor 1 to enter into the buffer controller 35 via the I/F 16 of the printer 7. As the DMA (direct access memory) instructs the buffer controller 35 to write on the basis of the command from the CPU 38, the buffer controller 35 stores the foregoing print data into the print buffer 18.

When storing the print data for one band (64 rasters) into the print buffer 18 is complete, next the buffer controller 35 is instructed to read out with the movement of the carriage 23 by the CPU 38 and reads out the print data stored in the print buffer 18 according to the procedure described below to distribute the print data to the printing controller 43.

The readout operation will be described with attention to a 0 channel shift register 52A and a 1 channel shift register 52B of the 4-bit shift register 52, referring to FIGS. 3 and 10. First, four bit print data (●0–●3) corresponding to the nozzle 21A of 1 channel being an odd channel are read out from the print buffer 18 at the input timing of a certain printing clock, for example, the first printing clock pulse, and are stored into the 1 channel shift register 52B of the 4-bit shift register 52 (S1). The 4-bit shift register 52 feeds data stored in the leading register (the right end register in FIG. 3) of each channel to the parallel-to-serial converter 51. Therefore, until the next second printing clock pulse enters (between S1 and S2), the 0 channel shift register 52A and the 1 channel shift register 52B transfer the data in the leading register to the printing head driver 19 via the parallel-to-serial converter 51. However, only the 1 channel shift register 52B has the print data (●0–●3) of four bits stored; and therefore, the first bit print data (●0) stored in the leading register of these print data (●0–●3) are transferred for each one bit. As the second printing clock pulse enters, the nozzle 21A of the precedent 1 channel starts printing; the first bit print data (●0) are printed and the data stored in each register of the 1 channel shift register 52B are shifted for each one bit (S2).

Next, as the third printing clock pulse enters, the second bit print data (●1) are printed which have been transferred to the printing head driver 19 directly before the third pulse enters, and print data (○0–○3) of four bits corresponding to the nozzle 21A of the 0 channel being an even channel are read out from the print buffer 18 to be stored in the 0 channel shift register 52A of the 4-bit shift register 52 (S3). Then, as the fourth printing clock pulse enters, the print data (○0, ●2) are printed which have been transferred to the printing head driver 19 from the 0 channel shift register 52A and 1 channel shift register 52B directly before the clock pulse enters (S4). While the storage of the print data of a four bit formation into the 0 channel shift register 52A and 1 channel shift register 52B is repeated alternately at every two pulses of the printing clock, the print data are transferred to the printing head driver 19 from both the shift registers 52A and 52B at the input timing of the printing clock to perform the printing of one band (S5 to S11).

As shown for example in S4, the print data (○0, ●2) are used at the same time for printing by the nozzles 21A, 21A of the 0 channel and 1 channel; and since these data (○0, ●2) are the dot data of the 0th bit and the second bit from the print buffer 18, the printing is done to be shifted for each two bits in the main scanning direction. However, in order that the odd channel nozzle 21A of the printing head 21 precede the even channel nozzle 21A in the main scanning in the right direction, these nozzles are arranged in two longitudinal rows to the main scanning direction, and the distance between the odd channel array and the even channel array is set to be double the printing pitch. Therefore, even in the 2 bit-shifted printing in the main scanning, the position of the print data (●0) that the nozzle 21A of the 0 channel print at S4 coincides in the main scanning direction with the position of the print data (○0) that the nozzle 21A of the preceding 1 channel prints at S2. Therefore, the printed state does not have any shift in position.

As described above, in the image recorder of this embodiment, the storage of the print data into the even channel shift registers and the storage of the print data into the odd channel shift registers are repeated alternately at every two pulses of the printing clock. Therefore, in one cycle of the printing clock, the number of the channels when the print data read out from the buffer 18 are stored into the 4-bit shift register 52 becomes half of the number of the entire channels. Thereby, the transfer of the print data can be completed in a shorter time than in a case that the print data are stored into the shift registers of all of the channels because it is not necessary to wait for the data to be transferred to all of the shift registers. Therefore, shortening the cycle of the printing clock can raise the printing speed of the image recorder.

Figure 11:
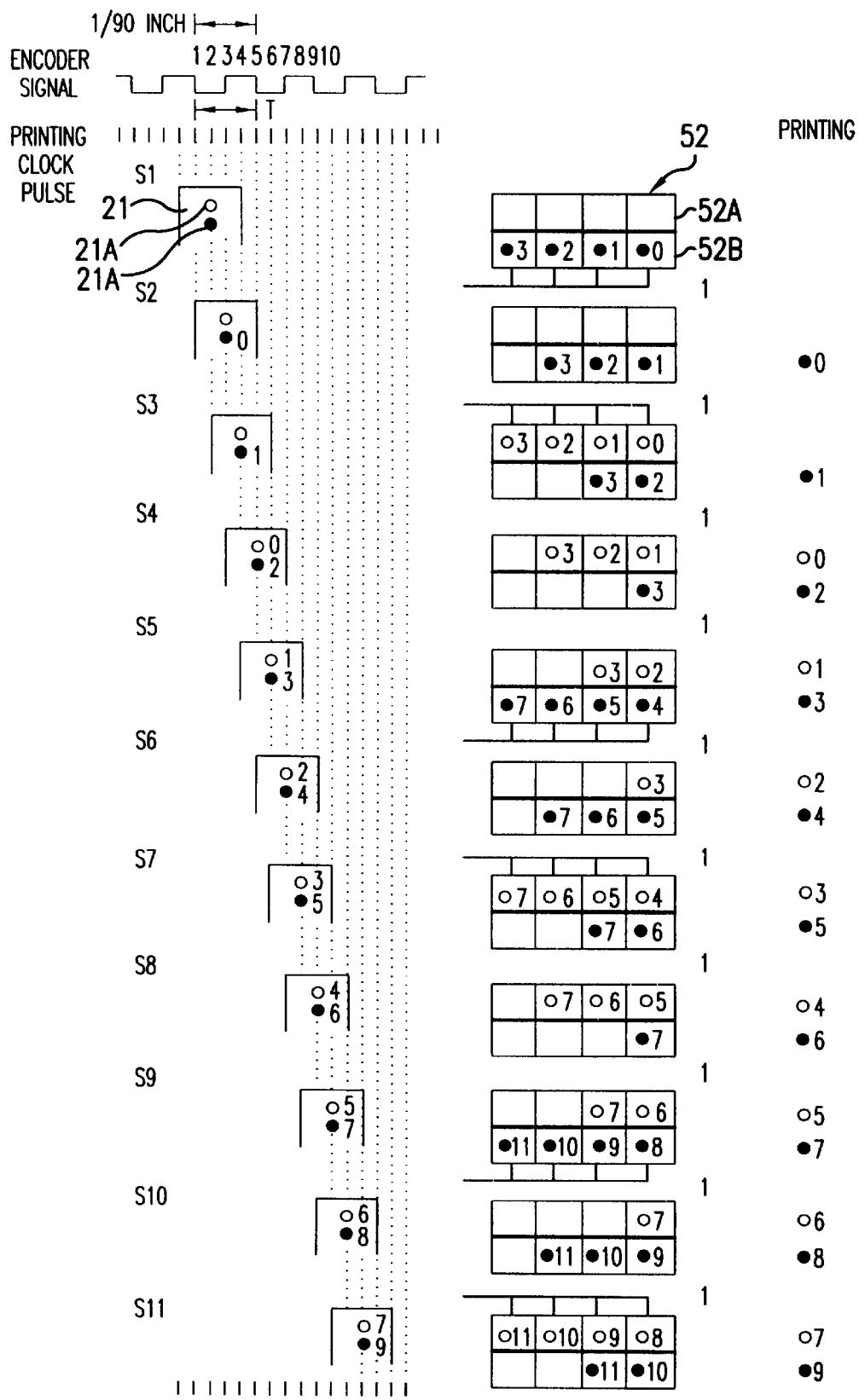
FIG. 11 is an explanatory chart of a data processing in a printing controller relating to a modified example of the first embodiment.

Further, in this embodiment, the nozzles 21A of the printing head 21 are arranged in two rows of the odd channels and even channels, however the arrangement is not limited to this, and the nozzles may be arranged in more than two rows. That is, when the nozzles are arranged in more than two rows, the print data may be distributed in divided into the channel groups of the number corresponding to the arrangement. As shown in FIG. 11, the nozzles 21A may be arranged in one longitudinal row to the printing head 21; however with this state unchanged, the print data gives a two-bit shift between the odd channel and the even channel.

Therefore, to cancel this shift, a correction has to be performed on the side of the information processor 1 or the printer 7.

When this correction is done on the side of the information processor 1, the dot image data may be formed in view of correcting the two-bit shift at the stage that the printer driver 14 produces the dot image data, or the dot image data may be corrected in view of the two-bit shift at the stage that the dot image data are transferred to the printer 7. When the correction is done on the side of the printer 7, it may be done at the stage of storing the dot image data (print data) received from the information processor 1 into the print buffer 18, or at the stage of storing the print data read out from the print buffer 18 into the 4-bit shift register 52; in consequence, the print data in which the correction of the two bit-shift is formulated may be stored into the 4-bit shift register 52.

Further, when the foregoing correction is applied, in the first embodiment shown in FIG. 3, the space between the array of even channel nozzles 21A and the array of odd channel nozzles 21A is not necessarily needed to be specified double the printing pitch. If the space is an integral multiple of the printing pitch, it may be triple or quadruple. If there may be any shift in the print data, the correction can be done to cancel the shift.

In the readout processing of this embodiment, the print data are divided into an odd-channel group and even-channel group, and the print data thus divided are alternately read out from the print buffer 18 to be stored into the 4-bit shift register 52, which, however, is not limited to this, and the channels may be divided into a first half and a second half, or it may be divided into more than two parts. In particular, the print data is transferred to odd channel group shift registers (1 channel group shift register, 3 channel group shift register, . . . , 63 channel group shift register) and to even channel group shift registers (0 channel group shift register, 2 channel group shift register, . . . , 62 channel group shift register) at a staggered timing. Likewise, the print data may be transferred to the first half shift registers 0–31 and to the second half shift registers 32–63 at a staggered timing.

Figure 13:
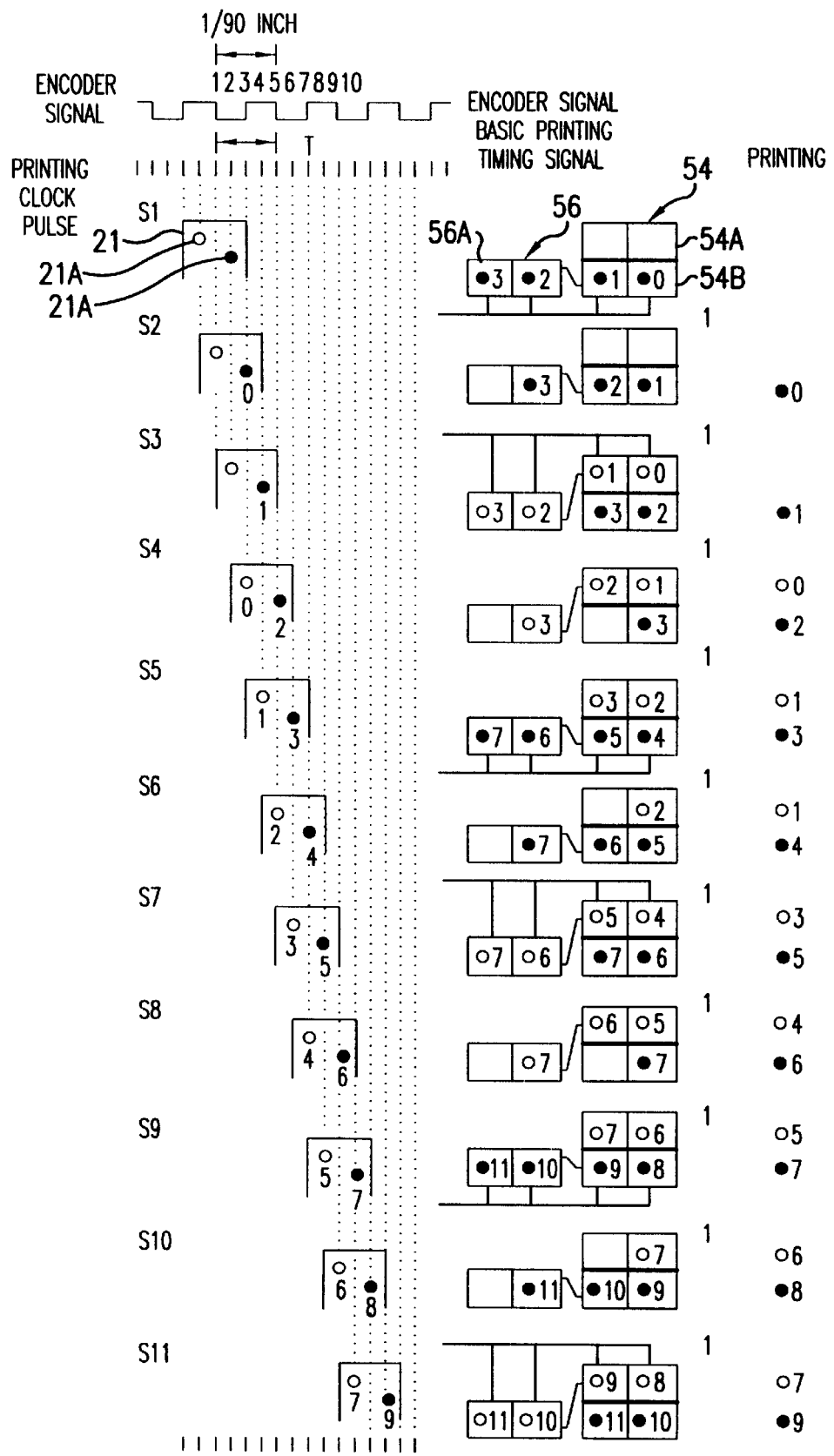
FIG. 13 is an explanatory chart of a data processing in the printing controller relating to the second embodiment.
Figure 14:
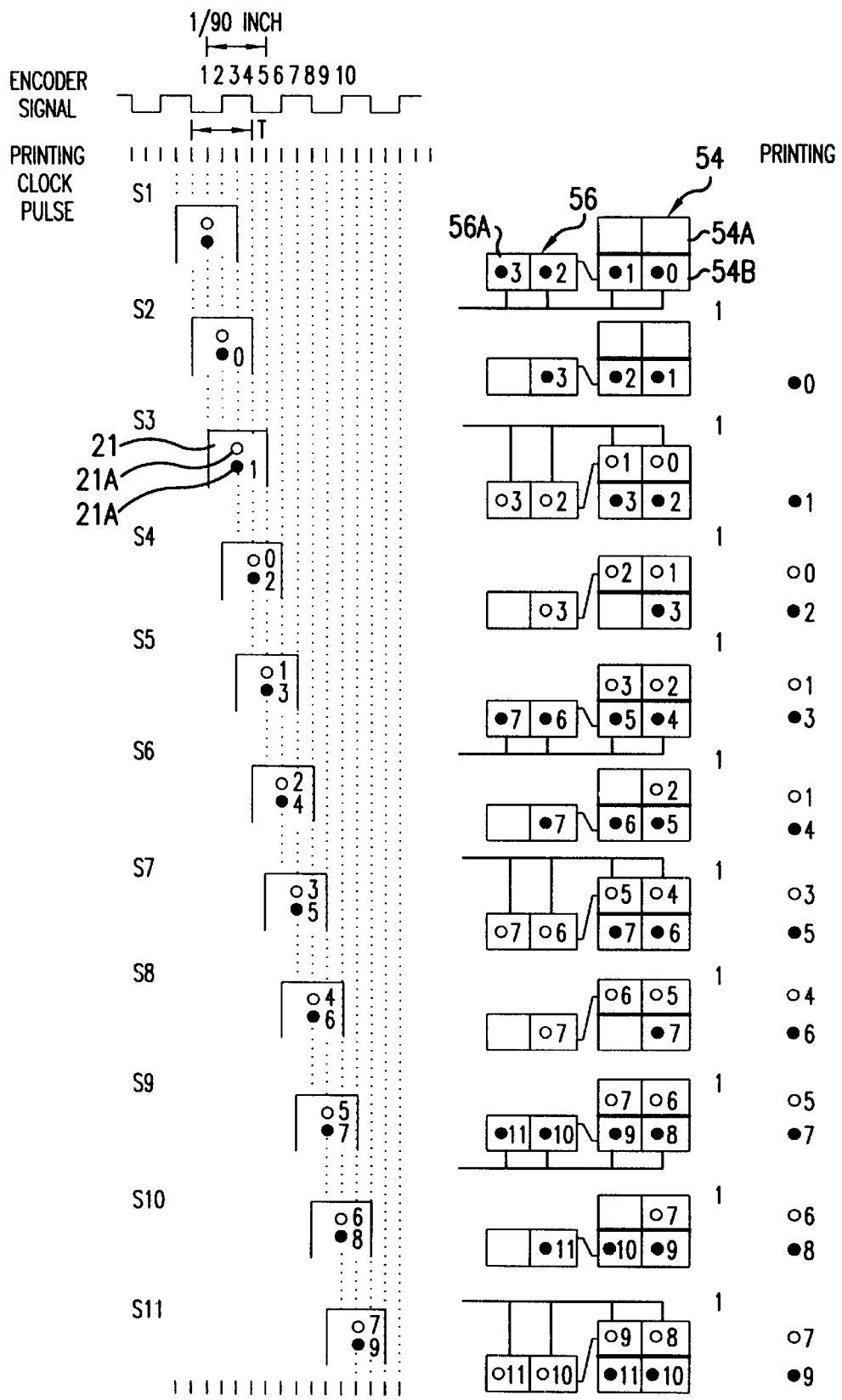
FIG. 14 is an explanatory chart of a data processing in the printing controller relating to a modified example of the second embodiment.

Next, a second embodiment of the invention will hereafter be described with reference to FIG. 12 to FIG. 14. The same elements as in the first embodiment are illustrated with the same reference numerals and the description for these elements will be omitted.

Figure 12:
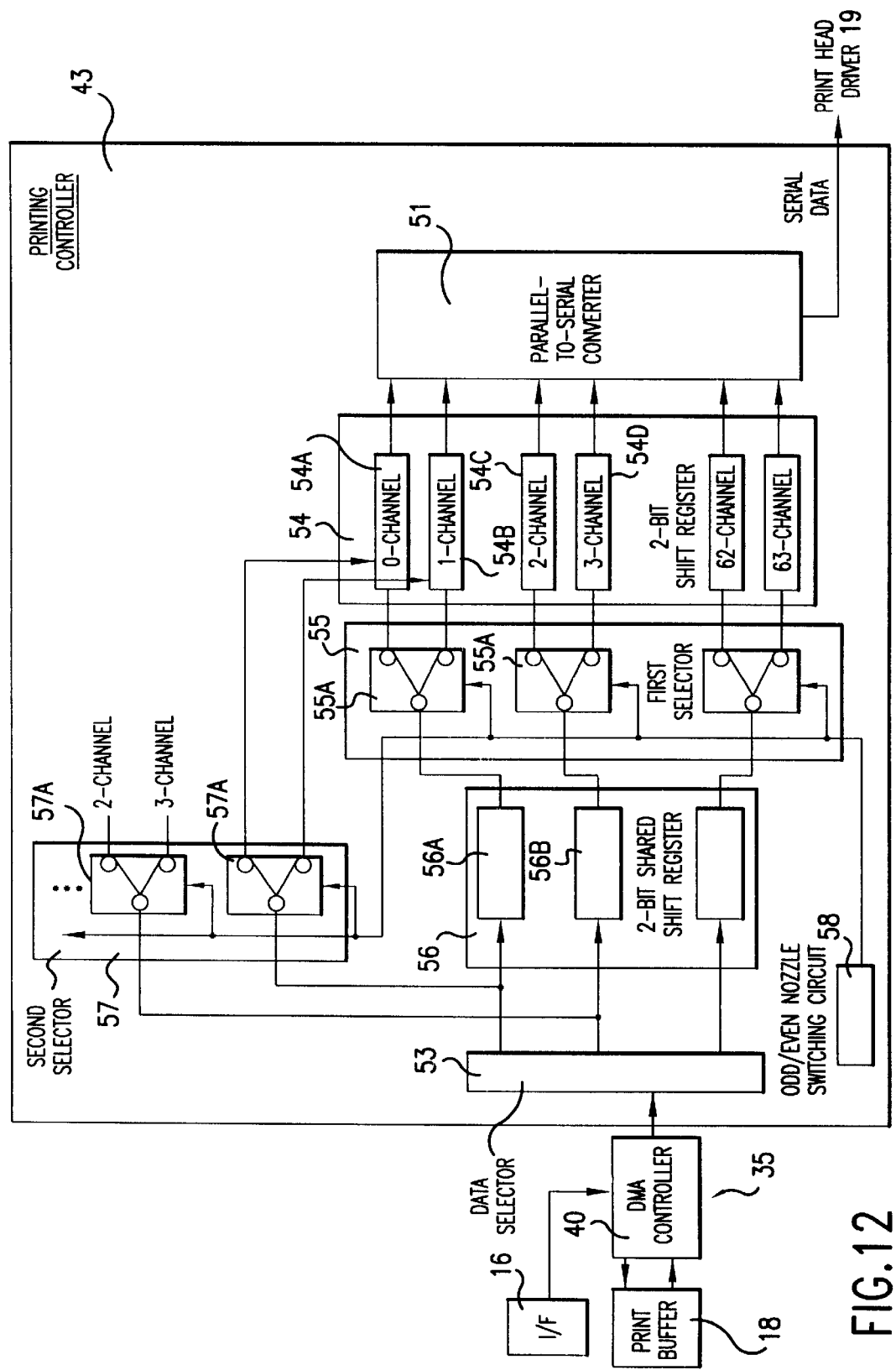
FIG. 12 is a block diagram of a printing controller in a second embodiment.

An image recorder relating to this embodiment, as shown in FIG. 12, is provided with a printing controller 43' that receives print data from the print buffer 18 via a readout processing by the buffer controller 35. The printing controller 43' is provided with a parallel-to-serial converter 51 that transfers the print data for each dot to the printing head driver 19 in a serial format at the input timing of a transfer clock and a 2-bit shift register unit 54 (a first shift register unit) that has 64 channels of 2-bit shift registers so as to distribute the print data of all channels (64 channels) for each dot to the parallel-to-serial converter 51.

The printing controller 43' is further provided with a first selector unit 55 and a second selector unit 57 having 32 1-input/2-output selector circuits 55A, 57A, respectively, a 2-bit shared shift register unit 56 (a second shift register unit) having 32 2-bit shift registers, a data selector 53, and an odd/even nozzle switching circuit 58 for switching the connection to the selector circuits 55A and 57A at each two pulses of a printing clock.

The output terminals of the selector circuit 55A provided in the forgoing first selector unit 55 are connected to an even-channel shift register (for example, 0 channel shift register 54A) and an odd-channel shift register (for example, 1 channel shift register 54B) of the 2-bit shift register unit 54. On the other hand, the input terminal of the selector circuit 55A is connected to a shift register (for example, 0/1-channel-shared shift register 56A) of the 2-bit shared shift register unit 56. Thus, the first selector unit 55 that switches the output connection of the selector circuit 55A shares the shift register (0/1-channel-shared shift register 56A) of the 2-bit shared shift register unit 56 with the even-channel shift register (0 channel shift register 54A) and odd-channel shift register (1 channel shift register 54B) of the 2-bit shift register unit 54.

On the other hand, the output terminals of the selector circuit 57A provided in the second selector unit 57 are connected to an even-channel shift register (for example, 0 channel shift register 54A) and an odd-channel shift register (for example, 1 channel shift register 54B) of the 2-bit shift register unit 54. The input terminal of the selector circuit 57A is connected to the data selector 53. Thus, the second selector unit 57 that switches the output connection of the selector circuit 57A stores the upper two bits of the print data having a four-bit formation into the even-channel shift register (for example, 0 channel shift register 54A) or the odd-channel shift register (for example, 1 channel shift register 54B), while the lower two bits of the print data are directly stored from the data selector 53 into the shift register (for example, 0/1-channel-shared shift register 56A) of the 2-bit shared shift register unit 56.

The operation of the image recorder of the forgoing construction will be described.

When print data are stored for one band (64 rasters) into the print buffer 18, the buffer controller 35 is instructed to read out with the movement of the carriage 23 by the CPU 38 and reads out the print data stored in the print buffer 18 according to the procedure described below to distribute the print data to the printing controller 43.

The readout operation will be described with attention to the 0 channel shift register 54A and the 1 channel shift register 54B of the 2-bit shift register unit 54, and the 0/1-channel-shared shift register 56A of the 2-bit shared shift register unit 56, referring to FIG. 13. First, four-bit print data (●0–●3) corresponding to 1 channel being an odd channel are read out at a specific printing clock timing, for example, at the first pulse from the print buffer 18. The upper two bits of the print data (●0, ●1) are transferred to the 1 channel shift register 54B of the 2-bit shift register unit 54, at the same time the lower two bits of the print data (●2, ●3) are stored into the 0/1-channel-shared shift register 56A of the 2-bit shared shift register unit 56 and the output connection of the selector circuits 55A and 57A of the first and second selector units 55 and 57 are switched to the 1 channel shift register 54B (S1).

The 2-bit shift register 54 feeds data stored in the leading register (the right register in FIG. 13) of each channel to the parallel-to-serial converter 51. Therefore, until the next second printing clock pulse enters (between S1 and S2), the 0 channel shift register 54A and 1 channel shift register 54B transfer the data in the leading register to the printing head driver 19 via the parallel-to-serial converter 51. However, only the 1 channel shift register 54B has the print data (●0, ●1) of two bits stored; and therefore, the first bit print data (●0) stored in the leading register of these print data (●0, ●1) are transferred for each one bit. As the second printing clock pulse enters, since the selector 55A has the 0/1-channel-shared shift register 56A connected to the 1 channel shift register 54B, the print data (●2, ●3) of the 0/1-channel-shared shift register 56A are transferred (shifted) for each one bit to the 1 channel shift register 54B, and the first bit print data (●0) are printed by the nozzle 21A of the preceding odd channel (S2).

Next, as the third printing clock pulse enters, the second bit print data (●1) are printed which have been transferred to the printing head driver 19 directly before the third pulse enters, and print data (○0–○3) of four bits corresponding to 0 channel being an even channel are read out from the print buffer 18. The upper two bits of the print data (○0, ○1) are transferred to the 0 channel shift register 54A of the 2-bit shift register unit 54 and the lower two bits of the print data (○2, ○3) are stored into the 0/1-channel-shared shift register 56A of the 2-bit shared shift register 56. The print data stored in the 0/1-channel-shared shift register 56A and 1 channel shift register 54B which are both connected directly before the printing clock enters are shifted for each one bit and, afterwards, the output connection of the selector circuits 55A and 57A of the first and second selector units 55 and 57 are switched to the 0 channel shift register 54A (S3).

As the fourth printing clock pulse enters, the print data (○0, ●2) are printed which have been transferred to the printing head driver 19 from the 0 channel shift register 54A and 1 channel shift register 54B directly before the clock pulse enters (S4). While the storage of the print data of a four bit formation into the 0/1-channel-shared shift register 56A and 0 channel shift register 54A or 1 channel shift register 54B is repeated alternately at every two pulses of the printing clock, the print data are transferred to the printing head driver 19 from both the shift registers 54A and 54B at the input timing of the printing clock to perform the printing of one band (S5 to S11).

As described above, in the image recorder of this embodiment, the storage of the print data into the even channel shift registers of the 0 channel shift register 54A and the storage of the print data into the odd channel shift registers of the 1 channel shift register 54B are repeated alternately at every two pulses of the printing clock. Therefore, in one cycle of the printing clock, the number of the channels when the print data read out from the print buffer 18 are stored into the 2-bit shift register unit 54 becomes half of the number of the entire channels. Thereby, the storage of the print data can be completed in a shorter time than in a case that the print data are stored into the shift registers of the entire channels. Therefore, shortening the cycle of the printing clock can raise the printing speed of the image recorder.

Further, in this embodiment, the 4-bit shift register of 64 channels is composed of the 2-bit shift register unit 54 formed of 64 2-bit shift registers and the 2-bit shared shift register unit 56 formed of 32 2-bit shift registers. Therefore, the circuit construction can be simplified compared to a case that all the channels are composed of 4-bit shift registers. Since shift registers need much more gates compared to selectors or the like, using a ASIC or gate arrays will produce considerably less expensive shift registers.

Furthermore, in this embodiment, the nozzles 21A of the printing head 21 are arranged in two rows of the odd and even channels, which, however, is not limited to this. As shown in FIG. 14, for example, the entire nozzles 21A are arranged in one row; and even in this case, the two bit shift of the print data created through the odd and even channels can be canceled according to the correction process described in the aforementioned embodiment. Therefore, the application of the readout process similar to the one described above can produce a similar effect. Since otherwise the construction and the operation are the same as the first embodiment, the description of like elements will be omitted.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An image recorder comprising:

a print buffer for storing print data received from a processor;

a printing head having printing elements for plural channels that print on the basis of the print data stored in the print buffer;

a storage device that temporarily stores the print data in the print buffer and supplies the print data to the printing elements sequentially for each dot to be printed; and a buffer control device that transfers the print data corresponding to a first channel group from the print buffer to the storage device at a staggered timing from transferring the print data corresponding to a second channel group from the print buffer to the storage device.

2. An image recorder as claimed in claim 1, wherein said printing elements are divided into an odd-channel group and an even-channel group, corresponding to the first channel group and the second channel group respectively.

3. An image recorder as claimed in claim 1, wherein said printing elements are divided into a first half channel group and a second half channel group, corresponding to the first channel group and the second channel group, respectively.

4. An image recorder as claimed in claim 2, wherein said storage device comprises a shift register.

5. An image recorder as claimed in claim 4, wherein said shift register stores four bits of the print data.

6. An image recorder as claimed in claim 5, wherein a space between the odd-channel group and the even-channel group of said printing elements is double a printing pitch of said image recorder.

7. An image recorder as claimed in claim 6, wherein each four bits of print data are stored alternately at every two pulses of a printing clock into registers corresponding to the odd channels of said shift register and registers corresponding to the even channels of the shift register.

8. An image recorder as claimed in claim 7, wherein said printing head is an ink jet head.

9. An image recorder as claimed in claim 4, wherein said buffer control device comprises a buffer controller and a printing controller.

10. An image recorder as claimed in claim 1, wherein said storage device includes a first shift register unit that sequentially supplies the print data for each dot to be printed to the printing elements and a second shift register unit that sequentially supplies the print data for each dot to the first shift register unit.

11. An image recorder as claimed in claim 10, wherein said first and second shift register units store two bits of the print data.

12. An image recorder as claimed in claim 11, wherein said first shift register unit is provided with 64 shift registers to store each two bits of print data, and said second shift register unit is provided with 32 shift registers to store for each two bits of print data.

13. An image recorder comprising:

a print buffer for temporarily storing print data;

a plurality of printing elements for printing based on the print data;

storage means for temporarily storing the print data and for supplying the print data from the print buffer to the plurality of printing elements for each dot to be printed; and buffer control means for transferring the print data corresponding to a first channel group from the print buffer to the storage means at a staggered timing from transferring the print data corresponding to a second channel group from the print buffer to the storage means.

14. An image recorder as claimed in claim 13, wherein said printing elements are divided into an odd-channel group and an even-channel group, corresponding to the first channel group and the second channel group, respectively.

15. An image recorder as claimed in claim 13, wherein said storage means comprises a shift register.

16. An image recorder as claimed in claim 14, wherein a space between the odd-channel group and the even-channel group of said printing elements is double a printing pitch of said image recorder.

17. An image recorder as claimed in claim 16, wherein each four bits of print data are stored alternately at every two pulses of a printing clock into registers corresponding to the odd channels of said shift register and registers corresponding to the even channels of the shift register.

18. An image recorder as claimed in claim 15, wherein said buffer control means comprises a buffer controller and a printing controller.

19. An image recorder as claimed in claim 13, wherein said storage means includes a first shift register unit that sequentially supplies the print data for each dot to be printed to the printing elements and a second shift register unit that sequentially supplies the print data for each dot to the first shift register unit.

20. An image recorder as claimed in claim 19, wherein said first shift register unit is provided with 64 shift registers to store each two bits of print data, and said second shift register unit is provided with 32 shift registers to store for each two bits of print data.

\* \* \* \* \*